United States Patent [19]

Sulzer

[11] Patent Number: 5,482,152

[45] Date of Patent: Jan. 9, 1996

[54] SORTATION TABLE

[75] Inventor: James E. Sulzer, Colorado Springs, Colo.

[73] Assignee: Portec, Inc., Oak Brook, Ill.

[21] Appl. No.: 276,442

[22] Filed: Jul. 18, 1994

[51] Int. Cl.[6] .................................................. B65G 11/20
[52] U.S. Cl. ........................................................ 193/32
[58] Field of Search ................................ 193/32, 40, 12; 221/191; 271/224

[56] References Cited

U.S. PATENT DOCUMENTS

| | | | |
|---|---|---|---|
| 1,641,998 | 9/1927 | von der Horst | 193/32 |
| 3,254,881 | 6/1966 | Rusk | 193/12 |
| 3,907,128 | 9/1975 | Cathers | 271/224 |
| 4,726,456 | 2/1988 | Hogsett | 193/32 |

FOREIGN PATENT DOCUMENTS 2213806  8/1989  United Kingdom ................... 193/12

*Primary Examiner*—Joseph E. Valenza
*Attorney, Agent, or Firm*—Joseph J. Kelly; Klaas, Law, O'Meara & Malkin

[57] ABSTRACT

A sortation table having apparatus to gradually slow moving articles to a stop and return the articles to a position for further processing.

7 Claims, 1 Drawing Sheet

SORTATION TABLE

FIELD OF THE INVENTION

This invention relates generally to the transport of articles from an upper location to a lower location over the upper surface of a spiral chute and more particularly to a sortation table for use with the spiral chute.

BACKGROUND OF THE INVENTION

In many instances, it is desirable to transport articles, such as parcels, packages, boxes, crates or other materials, from an upper location to a lower location. A particularly efficient system uses a molded fiberglass chute. The upper surface of the molded fiberglass chute is coated with a material so as to provide a low frictional surface thereon so that the articles placed thereon will move readily from the upper location to the lower location. In some instances, the coating provides a substantially friction-free surface so that articles placed thereon will have self starting movement in a direction toward the lower location. A sortation table is located at the lower location. Due to the low friction or friction-free surface, the articles move onto the sortation table at relatively high speeds. Therefore, it is desirable to have a safe and reliable means by which the movement of the articles can be stopped without damage to the articles.

BRIEF DESCRIPTION OF THE INVENTION

This invention provides a sortation table with resilient means for slowing down and stopping the movement of articles over the sortation table and then returning them to a location for further processing.

In a preferred embodiment of the invention the sortation table has a relatively planar surface and at least two sidewall extending upwardly therefrom. In some instances, three sidewalls are provided. At least one of the sidewalls is mounted for sliding movement over a portion of the relatively planar surface. Resilient means are provided to resist movement of the at least one of the sidewalls and to gradually stop the movement of the at least one of the sidewalls. The at least one sidewall has a front wall portion, a top wall portion and opposite sidewall portions. The mounting means comprise a housing having a top wall portion, a back wall portion and opposite sidewall portions, each having an inner surface. Support means are provided on the inner surfaces of the opposite sidewall portions so that an edge of each of the opposite sidewall portions is in contact with the support means for sliding movement thereover. The front wall portion has a wear strip attached to the bottom edge thereof and is in contact with the relatively planar surface. The wear strip is formed from a material having a low coefficient of friction so that it will slide easily over the generally planar surface.

The resilient means comprises an abutment surface mounted at a fixed location on the relatively planar surface. A plurality of openings are formed in the front wall portion and are in alignment with a plurality of openings in the abutment surface. A headed threaded bolt passes through each of the aligned openings to secure the housing to the sortation table. A coiled spring is mounted over each of the headed threaded bolts and is in contact with the front wall portion and the abutment surface and functions to urge the front wall portion away from the abutment surface. The movement of the front wall portion away from the abutment surface is limited by at least one nut threaded onto the headed threaded bolt. In operation, an article moving over the relatively planar surface contacts the front wall portion and starts to compress the springs. The compression of the springs gradually brings the article to a stop and then, in some instances, moves the article back to a location for further processing.

BRIEF DESCRIPTION OF THE DRAWINGS

An illustrative and presently preferred embodiment of the invention is shown in the accompanying drawing in which.

DETAILED DESCRIPTION OF THE INVENTION

Figure 1:
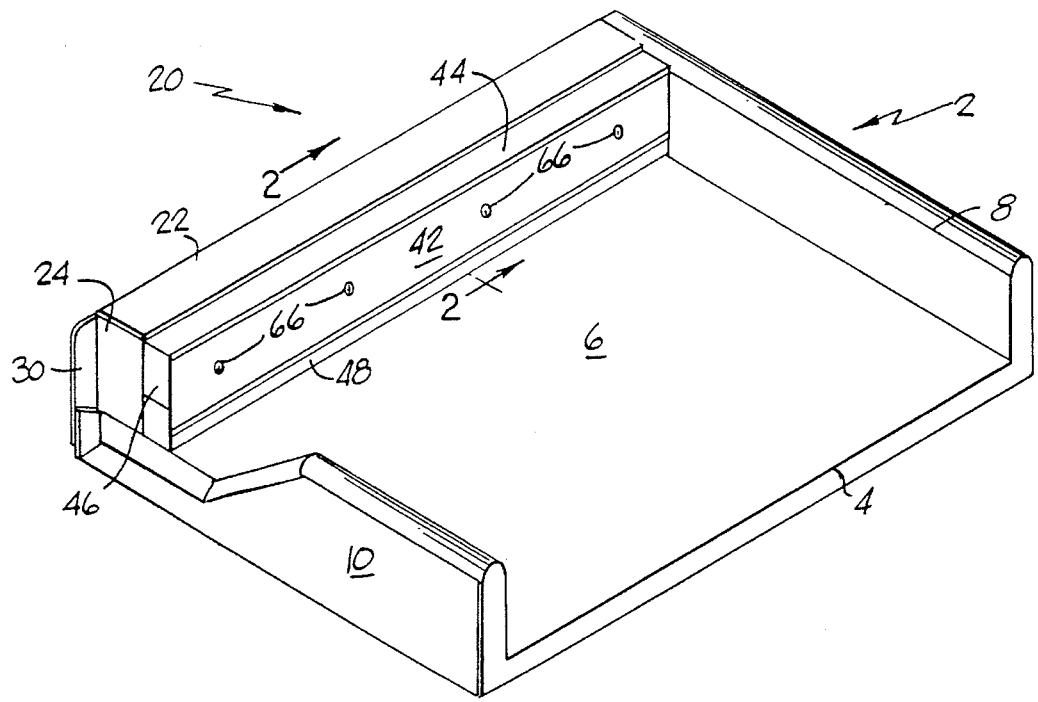
FIG. 1 is a perspective view of a portion of a sortation table.

In FIG. 1, there is illustrated a portion of a sortation table 2 for use at the end of a spiral chute such as that described in U.S. Pat. No. 4,726,456 which is incorporated herein by reference thereto. The sortation table 2 can be integral with the spiral chute or be separate therefrom. The sortation table 2 has a bottom portion 4 having a relatively planar surface 6. Sidewalls 8 and 10 extend upwardly from the bottom portion 4.

A removable housing 20 is mounted on the sortation table 2. The removable housing 20 has a first part comprising a top wall 22, opposite sidewalls 24, a back wall 26 and an open front end 28. The back wall 26 is dimensioned to form a flange 30 extending outwardly from the opposite sidewalls 24. The flange has a plurality of openings 32 formed therein. The end wall 34 has a plurality of threaded openings 36 formed therein and located to be aligned with the openings 32 when the housing 20 is placed on the relatively planar surface 6 so that the flange 30 can be secured to the sortation table 2 using headed threaded bolts (not shown). Each of the opposite sidewalls 24 has a support rail 38 for a purpose described below.

A slidable bumper 40 is mounted for sliding movement over a portion of the relatively planar surface 6. The slidable bumper 40 has a front wall 42, a top wall 44 and opposite sidewalls 46. A wear strip 48 is mounted on the bottom portion of the front wall 42 and is formed from a material having a relatively low coefficient of friction so that the bumper 40 can readily slide over the portion of the relatively planar surface 6.

A block 60 having an abutment surface 62 is secured to the opposite sidewalls 24. The block 60 and the front wall 42 have a plurality of spaced apart aligned openings (not shown) formed therein. A headed threaded bolt 64 having an enlarged head portion 66 passes through each of the aligned openings. A coiled spring 68 surrounds each threaded bolt 64 and is in contact with the abutment surface 62 and the front wall 42 and urges the front wall 42 away from abutment surface 62. The bottom edge 70 of the opposite sidewalls 24 slides over the upper surface 72 of the support rails 38. Stop means comprising nuts 74 are threaded onto the threaded bolt 64 to limit the movement of the front wall 42 away from the abutment surface 62.

Figure 2:
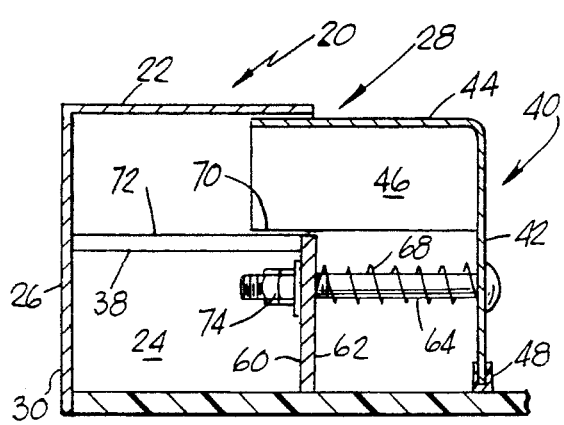
FIG. 2 is a cross-sectional view taken on the line 2—2 of FIG. 1.
Figure 3:
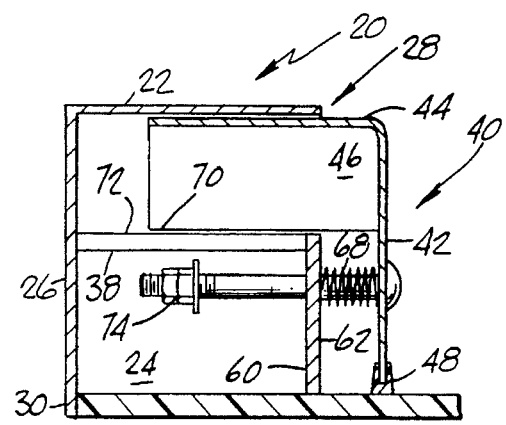
FIG. 3 is a view similar to FIG. 2 but illustrating the spring in a fully compressed position.
Figure 4:
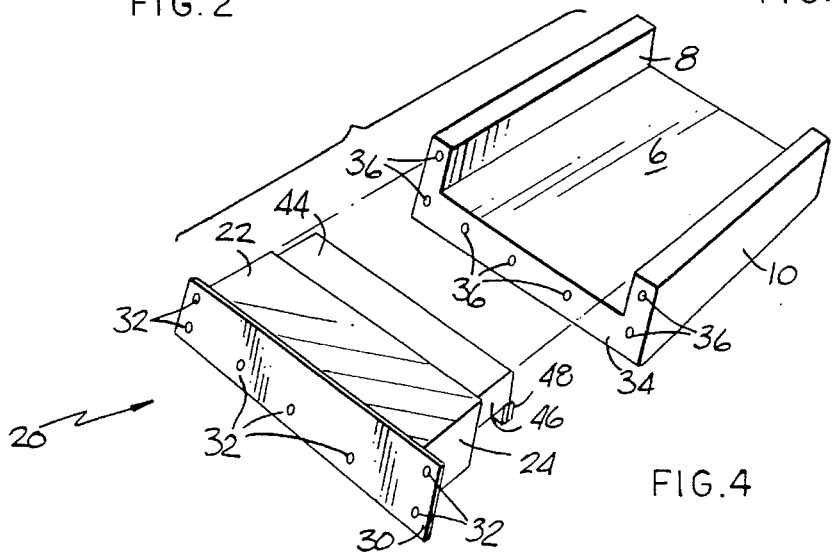
FIG. 4 is an exploded view of the housing and bumper relative to the table.

The apparatus is normally in the position illustrated in FIG. 2. When an article (not shown) moves over the relatively planar surface 6 and contacts the front wall 42, the front wall 42 will move toward the abutment surface 62. The coiled spring 68 will be compressed and the movement of the article will gradually be stopped. If the weight of the article is not too great, the coiled springs 68 will move the front wall 42 and the article in a direction away from the abutment surface 62 for further processing. If the sortation table 2 is to be used to allow articles to pass over it and onto a moving conveyor, the housing 20 will be removed.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A sortation table comprising:

a base portion having a bottom portion having a relatively planar surface located at the end of a spiral chute;

at least two spaced apart sidewalls extending upwardly from said relatively planar surface;

a housing mounted on said base portion;

said housing having a top wall, a back wall and opposite sidewalls each having an inner surface;

longitudinally extending support means mounted on said inner surface of said opposite sidewalls of said housing;

a slidable bumper having a top wall, a front wall and opposite sidewalls;

said opposite sidewalls of said slidable bumper having bottom edges in contact with and supported by said longitudinally extending support means for sliding movement thereover; and resilient means for resisting said sliding movement to absorb forces applied by articles moving over said relatively planar surface and into contact with said front wall.

2. A sortation table as in claim 1 and further comprising:

said front wall having a lower portion; and a wear strip mounted on said lower portion and in contact with said relatively planar surface.

3. A sortation table as in claim 2 wherein:

said wear strip is formed from a material having a low coefficient of friction.

4. A sortation table as in claim 1 wherein said resilient means comprise:

an abutment surface mounted at a fixed location;

at least one spring;

support means for supporting said at least one spring in contact with said abutment surface and said front wall to urge said front wall portion away from said abutment surface; and stop means for limiting the movement of said front wall away form said abutment means.

5. A sortation table as in claim 1 wherein said resilient means resilient means comprise:

an abutment surface mounted at a fixed location;

a plurality of spaced apart springs;

support means for supporting said plurality of spaced apart springs in contact with said abutment surface and said front wall to urge said front wall away from said abutment surface; and stop means for limiting the movement of said front wall portion away from said abutment means.

6. A sortation table as in claim 2 wherein said resilient means comprise:

an abutment surface mounted at a fixed location;

at least one spring;

support means for supporting said at least one spring in contact with said abutment surface and said front wall to urge said front wall portion away from said abutment surface; and stop means for limiting the movement of said front wall away form said abutment means.

7. A sortation table as in claim 2 wherein said resilient means comprise:

an abutment surface mounted at a fixed location;

a plurality of spaced apart springs;

support means for supporting said plurality of spaced apart springs in contact with said abutment surface and said front wall to urge said front wall away from said abutment surface; and stop means for limiting the movement of said front wall portion away from said abutment means.

* * * * *